April 25, 1933.  B. D. WOOLLEY  1,906,034
TIRE CHAIN
Filed Oct. 14, 1932

Inventor
B·D·Woolley

By W. S. McDowell
Attorney

Patented Apr. 25, 1933

1,906,034

UNITED STATES PATENT OFFICE

BRUCE D. WOOLLEY, OF JOHNSTOWN, OHIO

TIRE CHAIN

Application filed October 14, 1932. Serial No. 637,801.

This invention relates to improvements in non-skid chains for motor vehicle tires and pertains more particularly to a chain of this character which may be quickly and easily applied to the tire of the wheel without the necessity of jacking up or otherwise moving the vehicle.

The invention consists in providing the ends of the inner longitudinal side section of the chain, of the type now commonly used, with rods which may be readily grasped and connected with one another from the outside of the wheel without the necessity of taking hold of either end of the chain, which would necessarily be an inconvenient and cumbersome way of connecting the chain.

It is also an object of the invention to form the rods so that they may be readily attached to a regular tire chain without in any way shortening or altering the latter.

A further object of the invention is to incorporate in a slightly modified form of chain the use of the two rods heretofore mentioned, which chain is constructed with fewer transverse chain sections and due to the further spacing thereof, the chain may be readily applied to the wheel even though the latter is mired in a soft road bed and without raising the wheel. This chain which is primarily used in an emergency may thus be readily positioned in place upon the tire and connected with the two rods which span substantially the full distance between a pair of transverse sections of the chain.

With these and other objects in view, as will appear as the description proceeds, the invention consists in the novel features of construction, combinations of elements and arrangements of parts hereinafter to be more fully described and pointed out in the appended claims.

Figure 1:
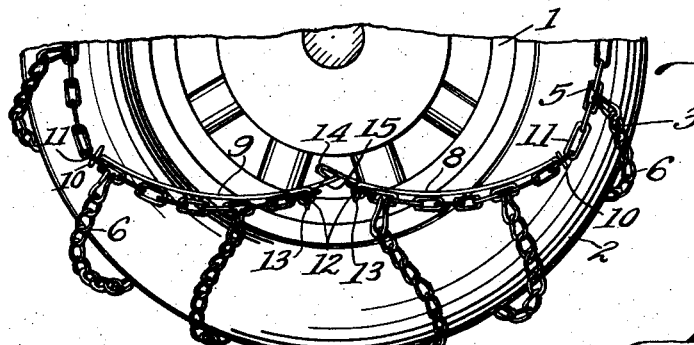
Fig. 1 is a side elevation of a portion of the vehicle wheel with the tire chain thereon in a position to have certain of its ends connected.
Figure 3:
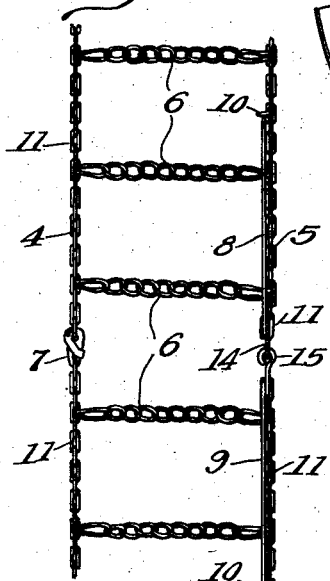
Fig. 3 is a plan view of the connecting ends of the chain.
Figure 2:
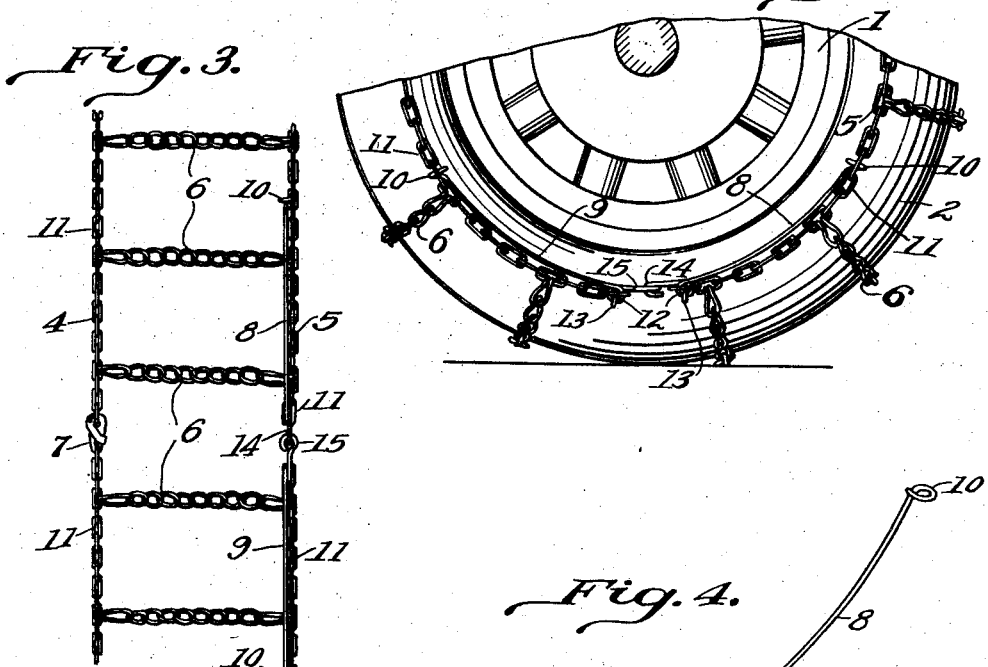
Fig. 2 is a similar view with the ends of the chain connected.
Figure 4:
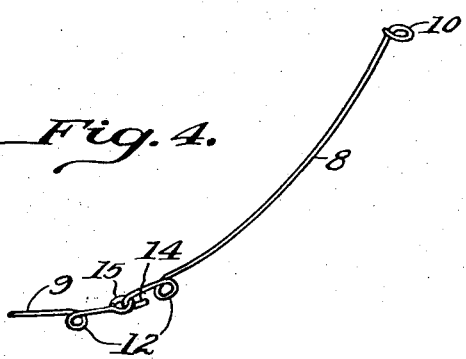
Fig. 4 is a perspective view of one of the rod members and a portion of its cooperating member.

Referring more particularly to the drawing, the numeral 1 designates a motor vehicle wheel upon which the usual pneumatic tire 2 is positioned. Applied to the tire is the chain 3 comprising the present invention. This chain as shown in Figs. 1, 2 and 3 is of the customary type and embodies the two longitudinal and parallelly extending side sections 4 and 5 and connected at intervals by the usual short transverse links or sections 6. The longitudinal side section 4 has one of its ends equipped with a hook 7 which is adapted for attachment to a link at the opposite end of the chain section and which section, when the chain is applied to the wheel, is positioned on the outer side of the wheel. The cooperative side section 5 which is equal in length to that of the section 4 has its end portions provided with a pair of rods 8 and 9 of slightly arcuate shape so as to conform substantially to the circumference of the wheel when the chain is put in place thereon.

The rods 8 and 9 which are lying substantially parallel with or adjacent the chain section 5 and are of a length substantially equal to the distance between three of the cross sections 6, have their inner ends formed with loops 10 for connection with one of the links 11 comprising the chain section 5. Formed near the outer ends of the rods are loops 12 which are trained through the end links 11 and inserted through this loop are cotter keys or rings 13 to hold the rods in place and prevent their accidental withdrawal from connection with the links 11. A hook 14 is formed with the outer end of the rod 8 and an eye 15 with the end of the rod 9 for uniting the rods when the same are in an operative position in connection with the vehicle tire.

One way of applying the chain to the wheel is as follows: The chain is laid over the wheel with the center cross chain or section thereof uppermost and with the longitudinal side section 5 of the chain, which carries the rods 8 and 9, on the side adjacent the vehicle body where it is most difficult to gain access to the ends of the chain section for uniting the same. The two rods 8 and 9 are now grasped, one in each hand, while the operator is stationed at the middle of the outside of the wheel. By extending the hands slightly to the inside of the wheel, it becomes very easy to connect the two rods. The chain is now pulled up on the outside and the ends of the outer section 4 connected in the usual manner, as by engaging the hook 7 with one of the links at the opposite end of the chain. Due to the fact that the connecting ends of the rods are formed with a hook and eye and that the hook opens toward the outside of the wheel, it will be necessary to elevate the rods or arrange them out of alignment with one another in order to connect or disconnect the same. This manner of connecting the rods make it impossible for the latter to become disengaged after the chain is drawn together and connected on the outside of the wheel as the rods will thus be substantially in alignment with one another.

It will be understood that instead of the hook and eye, other connections may be made to work equally as well. However, this type of connection is simple to make and has proven practical in its operation. Raising the connecting ends of the rods to the elevated position for connection, the operator may readily view the same through the spokes of the wheel and make the connection easily without the necessity of leaning over to any great extent or getting too close to the wheel which is an important advantage as modern vehicles are formed with drooping fenders that project downward to the front and rear of the wheel and which together with the bumpers, makes it difficult to reach or gain access to the inside of the wheel even though the wheel has been raised by means of a jack.

The connecting rods 8 and 9 may be sold separately and attached to standard sized chains with little or no difficulty by the user of the chain and the rods may also be shifted to various links in case the chain is of a length too great or small for the tire in order that the chain will be made to fit properly upon the tire.

Figure 5:
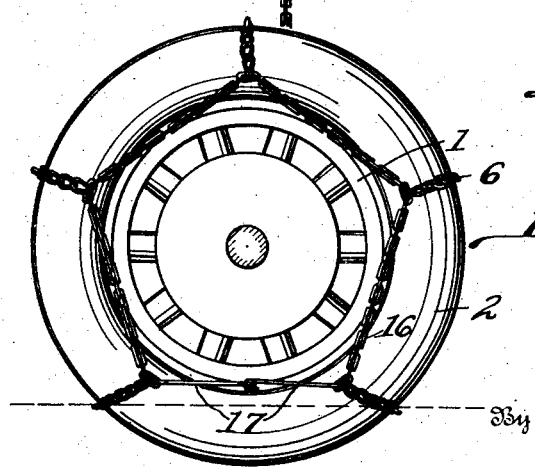
Fig. 5 is a side elevation of a wheel and tire having a slightly modified form of chain applied thereto.

In Fig. 5, there has been disclosed a modified form of chain, which may be termed an emergency chain. In this form of chain, the inner side section 16 is made shorter than the outer section of the chain and the cross chains formed fewer in number, preferably five, since this number seems the most practical for emergency use. These cross chains are spaced an equal distance apart and due to their greater spacing, the chain may be easily applied although the wheel is mired in a soft road bed to as great a distance as indicated by dotted lines covering practically the full cross-sectional area of a tire. In this, as well as the preferred form of the invention, two rods are used, the only difference being that in this form, the rods 17 instead of being slightly arcuate, and attached at each end thereof to the chain, the rods are straight and span the distance between the ends of the chain section 16. As these rods are also formed with a hook and eye at their meeting ends, it will be necessary to elevate the rods as in the preferred form in order to connect the same.

From the foregoing description, it will be readily seen that there has been provided a chain which may be easily applied to a wheel without the necessity of raising and otherwise moving the same, thereby attaching the chain with a minimum of time and labor and although the constructions shown and described are preferable, it will be understood that minor changes may be made without departing from the spirit and scope of the invention as set forth in the appended claims.

What is claimed is:

1. In a tire chain, two longitudinally extending side sections of equal length, a rod attached to each end of one of said sections, said rods being attached at one of their ends to the chain and lying substantially within the length of the latter, means formed near the other ends of said rods for the attachment to the end of said chain section, and a hook and eye formed wih the latter ends of said rods for connection to one another.

2. In a tire chain, two longitudinally extending side sections of equal length, transverse sections joining said side sections, a rod carried at each end of one of said side sections, said rods lying substantially parallel with said section and formed with loops at their inner ends for connection therewith, hook and eye members formed with the outer ends of said rods for connection with one another, and a loop formed with each rod at a point near the ends carrying said hook and eye members for attachment to one of the links at the outer ends of said section.

3. A tire chain including a pair of longitudinally extending side sections, a rod attached at each end of one of said sections and lying substantially parallel thereto with the outer ends of the rods substantially even with the outer ends of said sections, a hook and eye formed with the outer ends of said rods and adapted for connection with one another, the hook formed with one end of one of the rods lying in the plane of the body of the rod and open toward the other end thereof whereby said rods must be out of alignment with one another in order to connect or disconnect said hook with and from said eye.

4. A tire chain including a pair of longitudinally extending side sections of equal length, a rod attached at each end of one of said sections and lying substantially within the length thereof, and a hook and eye formed with the outer ends of said rods respectively and adapted to be engaged and disengaged only when said rods are out of alignment with one another.

5. A device of the character described comprising a pair of rods adapted for attachment to the ends of one of the side sections of a tire chain, said rods being formed with means at one of their ends for attachment to the chain section at a point spaced from the ends thereof substantially equal to the length of one of said rods, and a hook and eye formed at the other ends of said rods and adapted for engagement and disengagement with one another only when said rods are out of alignment with one another.

6. A device of the character described comprising a pair of rods adapted for attachment to the ends of one of the side sections of a tire chain, said rods being formed with means at one of their ends for attachment to the chain section at points spaced from their ends, additional means formed with said rods for attachment to the outer end links of said chain section, and additional means formed with the outer ends of said rods for detachable connection with one another.

In testimony whereof I affix my signature.

BRUCE D. WOOLLEY.